United States Patent [19]
Gleason et al.

[11] Patent Number: 5,803,688
[45] Date of Patent: Sep. 8, 1998

[54] METHODS AND APPARATUS FOR SECURING COMPONENTS IN NUCLEAR REACTORS

[75] Inventors: Thomas Edward Gleason, Monte Sereno; Jonathan D. Lazarus, Sunnyvale, both of Calif.

[73] Assignee: General Electric Company, Schenectady, N.Y.

[21] Appl. No.: 599,128

[22] Filed: Feb. 9, 1996

[51] Int. Cl.⁶ .............................. F16B 21/00; F16B 13/04
[52] U.S. Cl. .............................. 411/344; 411/345; 411/21
[58] Field of Search .............................. 411/21, 340, 344, 411/345, 346

[56] References Cited

U.S. PATENT DOCUMENTS

| | | | |
|---|---|---|---|
| 638,384 | 12/1899 | Dyer | 411/344 |
| 3,248,994 | 5/1966 | Mortensen | 411/344 |
| 3,707,898 | 1/1973 | Holly | 411/344 |
| 4,553,889 | 11/1985 | Le Dantec et al. | 411/21 |

FOREIGN PATENT DOCUMENTS

| | | | |
|---|---|---|---|
| 2549868 | 5/1976 | Germany | 411/345 |

*Primary Examiner*—Neill R. Wilson
*Attorney, Agent, or Firm*—Armstrong, Teasdale, Schlafly & Davis

[57] ABSTRACT

Methods and apparatus for securing a tie rod to a shroud support structure are described. One embodiment of the apparatus is a toggle bolt assembly including a toggle bolt body having an upper threaded portion and a lower toggle engaging portion. A toggle is rotatably secured to the toggle bolt body at the lower toggle engaging portion. A crimp nut including a threaded nut portion and a crimp collar is threadedly secured to the upper threaded portion of the toggle bolt body. Such toggle bolt assembly also includes a sleeve sized to have at least a portion of the toggle bolt body and the toggle located therein. The sleeve has a toggle opening so that the toggle can rotate from a first position in which the toggle is substantially located within the sleeve to a second position in which surface engaging portions of the toggle extend beyond the sleeve. A lower portion of the sleeve has a toggle rotation surface to facilitate rotation of the toggle.

15 Claims, 4 Drawing Sheets

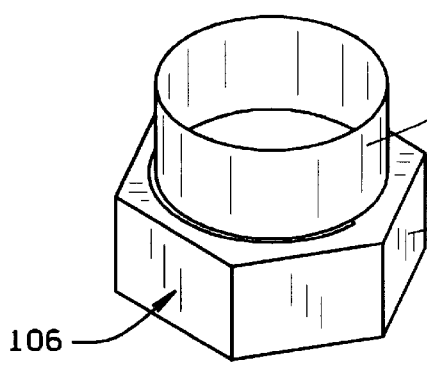
FIG. 8
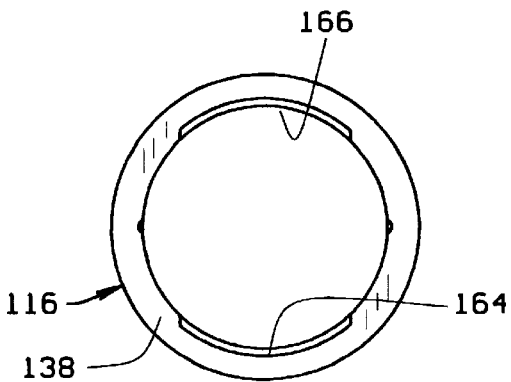
FIG. 9A
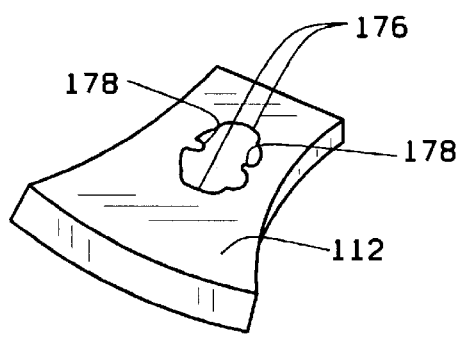
FIG. 9B
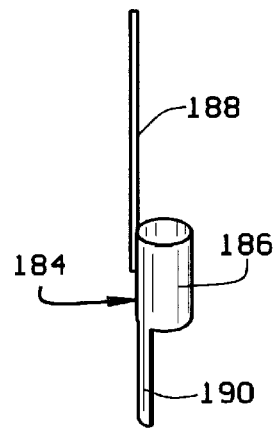
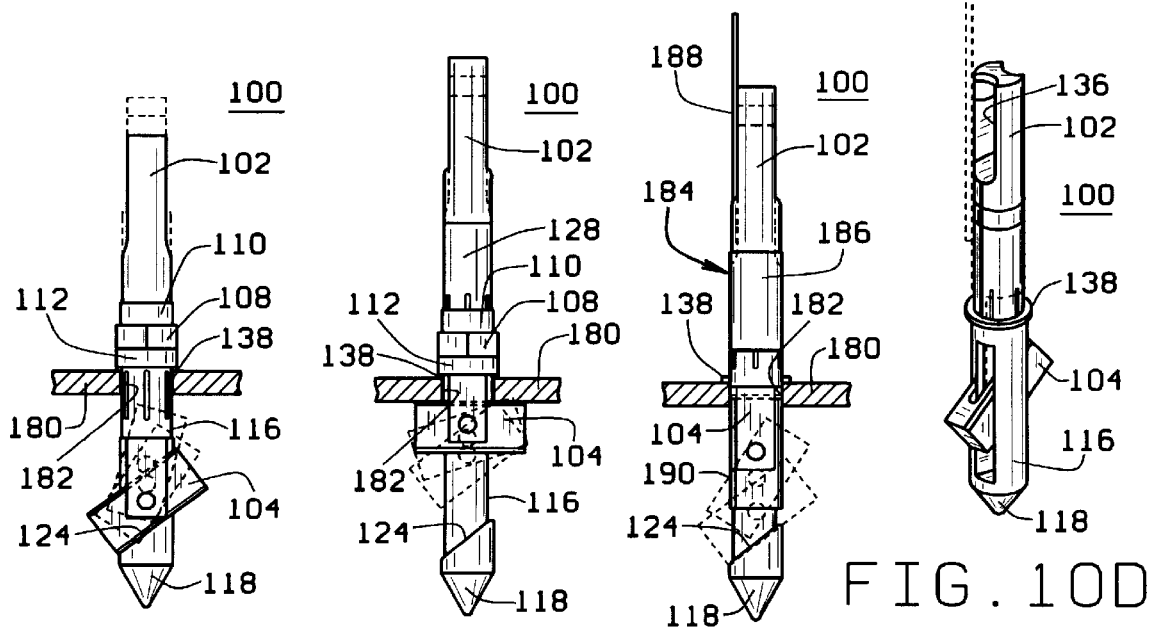
FIG. 10A   FIG. 10B   FIG. 10C   FIG. 10D

METHODS AND APPARATUS FOR SECURING COMPONENTS IN NUCLEAR REACTORS

FIELD OF THE INVENTION

This invention relates generally to apparatus and methods for performing repairs in nuclear reactors and, more particularly, to repairing stainless steel shrouds in nuclear reactors.

BACKGROUND OF THE INVENTION

In a known boiling water nuclear reactor configuration, a stainless steel shroud is located in the reactor pressure vessel (RPV) and substantially surrounds the reactor core, e.g., the fuel bundles. The shroud is supported in the RPV by a shroud support structure which includes an annular baffle plate, support skirt, support flange or support cone extending around a lower portion of the shroud and between the base of the shroud and the inner wall of the RPV. The space between the outer wall of the shroud and the reactor pressure vessel inner wall typically is referred to as the annulus.

In operation, water flows in a first direction, e.g., downward, on the annulus side of the shroud and in a second direction, e.g., upward, on the fuel core side of the shroud. The shroud therefore forms a boundary between the reactor water flows, sometimes referred to herein as a fluid, or flow, partition.

The shroud typically is constructed from a number of stainless steel cylindrical courses. The courses are welded together. If the shroud experiences cracking, e.g., at the circumferential welds between shroud courses, it is desirable to exert a compressive load on the shroud courses to prevent the courses from separating at any circumferential weld crack to maintain the integrity of the flow partition.

Tie rod assemblies have been used to apply a compressive load on the cylindrical shroud courses. In one known assembly, the lower end of each tie rod is secured to a structure within the reactor which is connected to, or bears against, the lower end of the shroud. The upper end of each tie rod is connected to, or bears against, the upper end of the shroud. The tie rods exert a compressive load on the shroud and prevent the shroud from separating at any circumferential weld cracks.

To secure the tie rod at the lower end of the shroud in one known configuration, circular holes are cut in the shroud support, and toggle bolts are inserted at least partially through each circular hole. The inserted toggles are then rotated from a vertical to a horizontal attitude so that the toggle spans across the insertion hole and bears against the bottom surface of the shroud support member. The shroud support member provides a load path to the shroud so that a tie rod coupled to the toggle bolt can exert a compressive force on the shroud.

Removing known toggle bolt assemblies from the holes in the shroud support structures can be extremely difficult. For example, with known configurations, gravity force is used to rotate the toggle from the vertical attitude to the horizontal attitude so that the toggle assembly opposes removal. Further, after axial loading and exposure to the reactor environment over several fuel cycles, the toggle may bind on its pivot. Gravity force therefore may not be sufficient to cause the toggle to rotate during subsequent remote removal and reinstallation activities.

It therefore would be desirable to provide a toggle bolt assembly which enables the toggle to be remotely rotated so that the toggle can be easily and quickly engaged and disengaged from the shroud support structure. It also would be desirable to provide such a toggle bolt assembly which can be installed and removed under positive control, so that friction or binding of the toggle which may not be overcome by gravity force, is overcome by mechanically applied force.

SUMMARY OF THE INVENTION

These and other objects are attained by methods and apparatus for securing a tie rod to a shroud support structure which, in one embodiment of the apparatus, is a toggle bolt assembly including a toggle bolt having a tie rod engaging portion, a threaded portion and a lower toggle engaging portion. A toggle is rotatably secured to the toggle bolt at the lower toggle engaging portion. A crimp nut including a threaded nut portion and a crimp collar is threadedly secured to the threaded portion of the toggle bolt.

The toggle bolt assembly also includes a sleeve sized to have at least a portion of the toggle bolt and the toggle located therein. The sleeve has a toggle opening, or slot, so that the toggle can rotate from a first position in which the toggle is substantially located within the sleeve to a second position in which surface engaging portions of the toggle extend beyond the sleeve. A lower portion of the sleeve has a toggle rotation surface to facilitate rotation of the toggle.

In operation, rotating the crimp nut in a first direction causes the toggle bolt to lower in the sleeve. When the toggle contacts the lower portion of the sleeve, the toggle begins to rotate so that surface engaging portions of the toggle extend beyond the sleeve. Once the toggle is so rotated, the toggle bolt is drawn in the other direction, e.g., upward, by rotating the crimp nut in the opposite direction. As the toggle bolt is drawn upward, the toggle is pulled into firm contact with the shroud support structure. The crimp portion of the crimp nut is then crimped so that the toggle bolt assembly remains securely engaged to the shroud support structure.

To remove the toggle bolt assembly, a torque is applied to the nut sufficient to overcome the forces of the crimp. The nut is then rotated so that the toggle bolt is lowered in the sleeve and so that the toggle is disengaged from the shroud support structure and is free to be rotated back into the sleeve. In one embodiment, a shim tool is used to rotate the toggle to be substantially located within the sleeve. In another embodiment, a stepped surface of the slot formed in the sleeve causes the toggle to rotate to be substantially located within the sleeve. Once the toggle is located within the sleeve, the toggle bolt assembly can then be easily removed from the shroud support structure.

The above described toggle bolt assembly enables the toggle to be remotely rotated so that the toggle can be easily and quickly engaged and disengaged from the shroud support structure. Such assembly also can be installed and removed under positive control so that friction or binding of the toggle that may not be overcome by gravity force, is overcome by mechanically applied force.

BRIEF DESCRIPTION OF THE DRAWINGS

FIG. 8 is a perspective view of the crimp nut used in the toggle bolt assembly shown in FIG. 1.

FIG. 9A is a top view of the sheath shown in FIG. 6 and FIG. 9B is a perspective view of anti-rotation member 112 shown in FIGS. 1, 2 and 3.

FIGS. 10A and 10B illustrate various positions of the toggle bolt assembly in securing such assembly to the shroud support structure, and FIGS. 10C and 10D illustrate various positions of the toggle bolt assembly in removing the assembly from the shroud support.

DETAILED DESCRIPTION OF THE DRAWINGS

Figures 1, 2, 3:
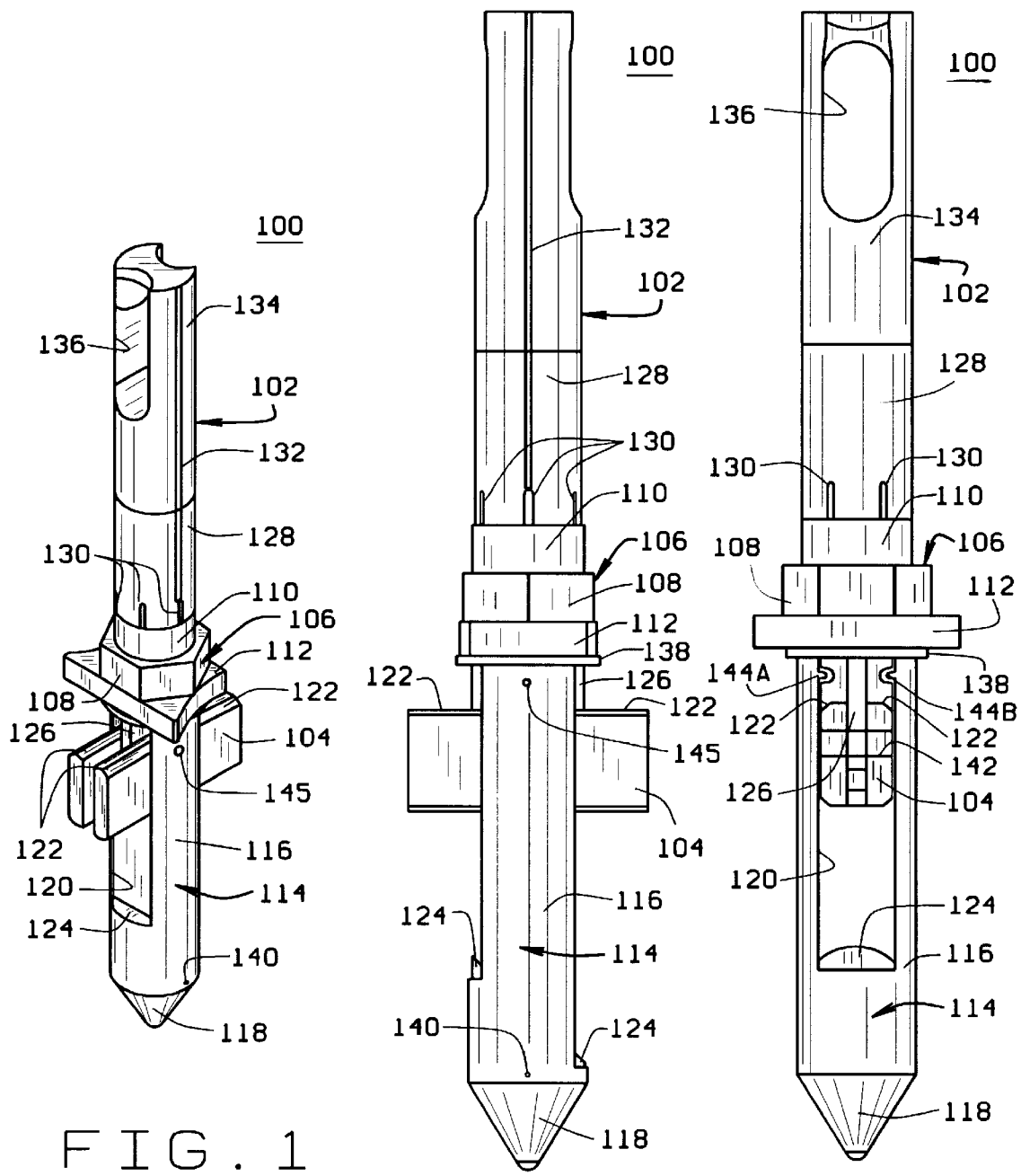
FIG. 1 is a perspective view of one embodiment of a toggle bolt assembly in accordance with the present invention.
FIG. 2 is a front view of the toggle bolt assembly shown in FIG. 1.
FIG. 3 is a side view of the toggle bolt assembly shown in FIG. 1.

FIG. 1 is a perspective view of one embodiment of a toggle bolt assembly 100 in accordance with the present invention. Toggle bolt assembly 100 includes a toggle bolt body 102 having a toggle 104 rotatably secured thereto. Assembly 100 further includes a crimp nut 106 having a threaded nut portion 108 and a crimp collar 110. An anti-rotation member 112 is inserted over bolt 102 and just below crimp nut 106 so that a nut rotating tool (not shown), e.g., a socket, lowered over nut 108 will not rotate toggle bolt body 102 when turning nut 108.

Assembly 100 also has a sleeve 114 which includes a sheath portion 116 closed at one end by a sheath nose 118. Sheath portion 116 is sized to have at least a portion of toggle bolt body 102 and toggle 104 located therein. Sheath portion 116 has opposed toggle slots, or openings, 120 (only one such opening is visible in FIG. 1) so that toggle 104 can rotate from a first position in which toggle 104 is substantially located within sheath portion 116 (not shown in FIG. 1) to a second position in which surface engaging portions 122 of toggle 104 extend beyond sheath portion 116. A toggle rotation surface 124 facilitates rotation of toggle 104. As described herein after in more detail, toggle 104 is rotatably coupled to a lower toggle engaging portion 126 of toggle bolt body 102.

Toggle bolt body 102 also includes a threaded portion 128 which threadedly engages to crimp nut 108. A plurality of longitudinal grooves 130 are formed in upper threaded portion 128 to facilitate forming secure engagement between bolt 102 and crimp collar 110 as described hereinafter in more detail. Also, a plurality of grooves 132 are formed in toggle bolt body 102 to engage protrusions (not shown in FIG. 1) from anti-rotation member 112, which member 112 bears against adjacent reactor features and prevents rotation of toggle bolt body 102. Grooves 130 may also engage such anti-rotation member protrusions.

A tie rod engaging portion 134 of toggle bolt body 102 is secured to threaded portion 128. Tie rod engaging portion 134 includes a tie rod engagement opening 136 which facilitates connecting a tie rod (not shown) into engagement with assembly 100.

FIG. 2 is a front view of toggle bolt assembly 100 shown in FIG. 1. An upper support flange 138 of sheath portion 116 is clearly shown in FIG. 2. Support flange 138, as described hereinafter in more detail, rests on top of a surface of a component of the shroud support structure and prevents assembly 100 from passing through the hole cut in the structure for receiving assembly 100. A pin 140 which extends through aligned openings in sheath 116 and sheath nose 118 to maintain nose 118 in firm engagement with sheath 116 also is shown in FIG. 2.

FIG. 3 is a side view of toggle bolt assembly 100 shown in FIG. 1. As shown in FIG. 2, a dowel pin 142 is press fit into engagement with toggle 104 and extending through an opening in lower toggle engaging portion 126 of toggle bolt body 102. Dowel pin 142 and thus toggle 104 are rotatable with respect to toggle bolt body 102. Stop pins 144A and 144B extend outward from toggle bolt body 102 into grooves (not shown in FIG. 3) on the inside of the walls of sheath 116 and facilitate azimuthal alignment of openings 120 in sheath 114 with toggle 104. In addition, stop pins 144A and 144B retain sheath 114 on toggle bolt body 102. Stop pins 144A and 144B are inserted into toggle bolt body through openings 145 shown in FIGS. 1 and 2 (only one opening 145 is visible in such figures).

Figure 4:
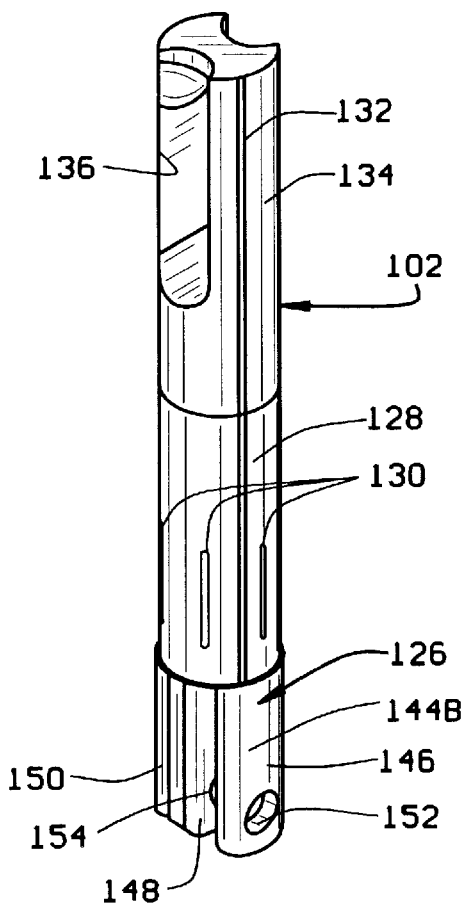
FIG. 4 is a perspective view of the toggle bolt body used in the assembly shown in FIG. 1.

FIG. 4 is a perspective view of toggle bolt body 102 in assembly 100 shown in FIG. 1. Lower toggle engaging portion 126 of toggle bolt body 102 includes three prongs 146, 148 and 150 having aligned openings 152, 154 and 156 (not visible in FIG. 4) for receiving dowel pin 142 (FIG. 3). An end of stop pin 144B also is shown in FIG. 4. Of course, more or fewer prongs could be used at lower toggle engaging portion 126.

Figure 5:
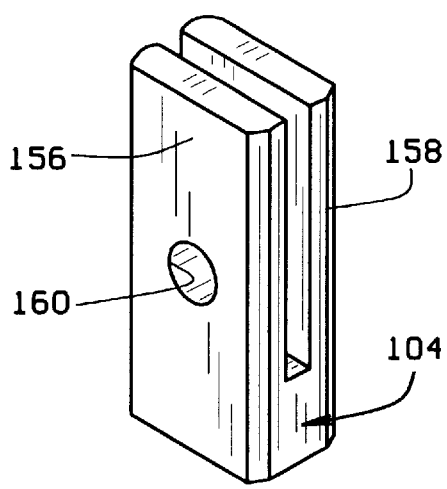
FIG. 5 is a perspective view of the toggle used with the toggle bolt shown in FIG. 4.

FIG. 5 is a perspective view of toggle 104 used with toggle bolt body 102 shown in FIG. 4. Toggle 104 is substantially u-shaped and includes leg portions 156 and 158 having aligned openings 160 (one opening 160 is not visible in FIG. 5) for receiving dowel pin 142 (FIG. 3). Openings 160 are configured to be aligned with openings 152, 154 and 156 (FIG. 4) and dowel pin 142 is inserted through the aligned openings to maintain toggle 104 in rotatable engagement with toggle bolt body 102. Toggle 104 could, alternatively, be E-shaped or I-shaped.

Figure 6:
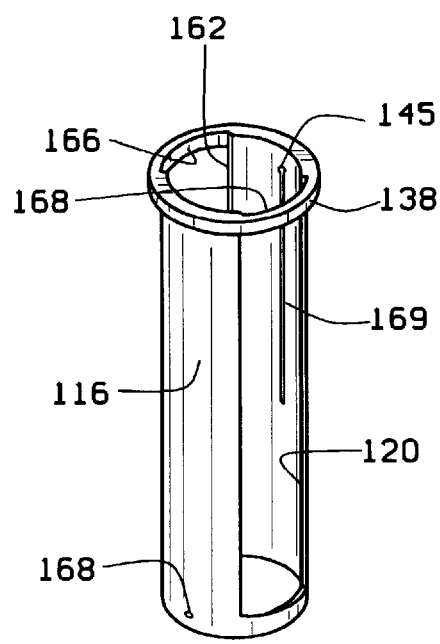
FIG. 6 is a perspective view of the sheath used in the assembly shown in FIG. 1.

FIG. 6 is a perspective view of sheath portion 116 of sleeve 114 (FIG. 1). Toggle slots, or openings, 120 and 162 are formed in sheath portion 116. Also, shim slots 164 and 166 are formed through flange portion 138 so that a finger of a shim tool can extend through either shim slot 164 or 166 and into contact with toggle 104 as described hereinafter in more detail. An opening 168 formed in sheath portion 116 is utilized to connect sheath nose 118 (FIG. 7) thereto. Alternatively, sheath nose 118 could be integral with sheath portion 116. Grooves 169 (only one groove 169 is shown in FIG. 6) are formed in an inner wall of sheath portion 116 and mate with respective pins 144A and 144B (FIG. 3).

Figure 7:
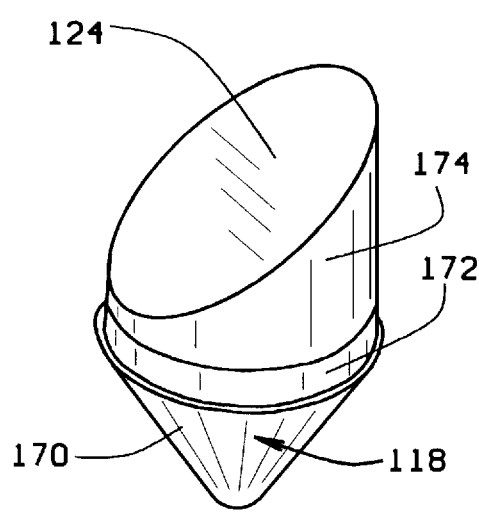
FIG. 7 is a perspective view of the sheath nose used with the sheath shown in FIG. 6.

FIG. 7 is a perspective view of sheath nose 118 used with sheath portion 116 (FIG. 6). Nose 118 includes a substantially conical end portion 170 having a flange 172. An extension 174 terminating in inclined toggle rotation surface 124 is inserted within end portion 170 and fastened thereto.

FIG. 8 is a perspective view of crimp nut 106 used in the toggle bolt assembly shown in FIG. 1. As explained above, crimp nut 106 includes threaded nut portion 108 and crimp collar 110.

FIG. 9A is a top view of sheath 116 shown in FIG. 6. As explained above, sheath portion 116 also includes shim slot 164 and 166. The finger of the shim tool extends through one of shim slots 164 and 166 in sheath portion 116 to make contact with toggle 104.

FIG. 9B is a perspective view of anti-rotation member 112. As shown in FIG. 9B, shim slots 176 are formed through member 112 so that the finger of a shim tool (not shown in FIG. 9B) can extend through member 112 and contact toggle 104. Also, protrusions 178 extend inward and are configured to mate with grooves 132 in toggle bolt body 102 shown in FIG. 1, for example.

FIGS. 10A, 10B, 10C and 10D illustrate various positions of toggle bolt assembly 100 in securing and removing such assembly 100 from shroud support structure 180 having an opening 182 therethrough. More particularly, and referring to Figure 10A, assembly 100 is inserted through opening 182 until flange 138 engages structure 178 and supports assembly 100 as shown. Bolt body 102 is then lowered, by rotating nut 108 in a first direction. In the initial position, toggle 104 is vertical and fully positioned within sheath portion 116. As bolt body 102 is lowered, toggle 104 contacts toggle rotation surface 124 and begins to rotate.

Referring now to Figure 10B, once toggle 104 is in substantial surface to surface contact with surface 124, bolt body 102 is then pulled upward by rotating nut 108 in a second, or opposite, direction. Toggle 104 contacts a lower surface of structure 180, and as toggle bolt body 102 is continued to be driven upward by rotation of nut 108, toggle 104 tightens against structure 180. When toggle 104 is fully tightened against structure 180, crimp collar 110 is crimped against bolt 102. Such crimping facilitates retaining nut 108 in the desired position.

To remove assembly 100, and referring to FIG. 10C, a torque is applied to nut portion 108 so that the forces of crimp collar 110 are overcome by the applied torque. Crimp nut 106 is then removed from bolt body 102. As bolt body 102 is lowered, toggle 104 begins to rotate back towards the initial position. Toggle 104 eventually contacts toggle rotation surface 124 and then bolt body 102 is drawn upward.

As shown in FIG. 10D, shim tool 184 is then positioned so that a collar 186 of shim tool 184 has bolt body 102 inserted therethrough. Shim tool 184 is lowered over bolt 102 using an extension 188 that may be coupled, for example, to a pole. Tool 184 also includes a shim finger 190 which extends through shim openings 176 (FIG. 9B) and shim openings 164 or 166 (FIG. 9A) into contact with toggle 104. Cooperation between shim tool 184 and sheath portion 116 causes bolt 102 to rotate fully within sheath portion 116 to the initial position (see FIG. 10C). Once toggle 104 is in the initial position, assembly 100 can be withdrawn from opening 182 and removed.

Toggle bolt assembly 100 described above enables toggle 104 to be remotely rotated so that toggle 104 can be easily and quickly engaged and disengaged from shroud support structure 180. Such assembly 100 also can be installed and removed under positive control so that friction or binding of toggle 104 that may not be overcome by gravity force is overcome by mechanically applied force.

Figures 11A, 11B:
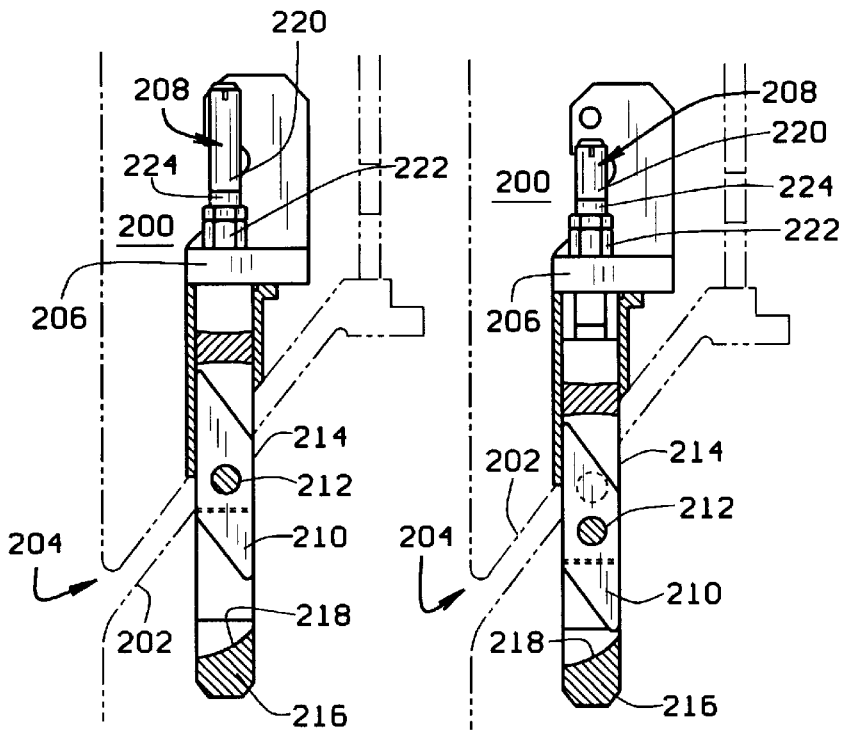
FIGS. 11A, 11B, 11C, 11D and 11E illustrate an alternative embodiment of a toggle bolt assembly in accordance with the present invention.

FIGS. 11A, 11B, 11C, 11D and 11E illustrate an alternative embodiment of a toggle bolt assembly 200 in accordance with the present invention. Referring to FIG. 11A, assembly 200 is illustrated in connection with a conical shroud support structure 202 extending inward from reactor vessel 204. A support platform 206 for supporting a tie rod (not shown) extends from conical shroud support structure 202. Assembly 200 includes a toggle bolt body 208 which extends through aligned openings in support platform 206 and conical shroud support structure 202. A toggle 210 is connected to bolt 208 by a dowel pin 212. Toggle 210 and bolt 208 extend through a slotted sleeve 214 that extends from platform 206 through the opening in conical shroud support structure 202. One end of sleeve 214 is closed by a plug 216 having a radial surface 218. An upper portion 220 of bolt 208 is threaded, and such threaded portion is in engagement with a crimp nut 222 which has a crimp collar 224.

To tighten toggle 210 against a conical shroud support structure 202, nut 222 is rotated, e.g., counterclockwise, to move toggle bolt body 208 through sleeve 214 so that toggle 210 makes contact with radial surface 218 as shown in FIG. 11B. Further movement of toggle bolt body 208 towards surface 218 causes toggle 210 to rate through a slot (not shown in Figure 11B) in sleeve 214.

Figure 11D:
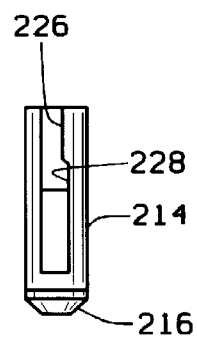
Figures 11C, 11E:
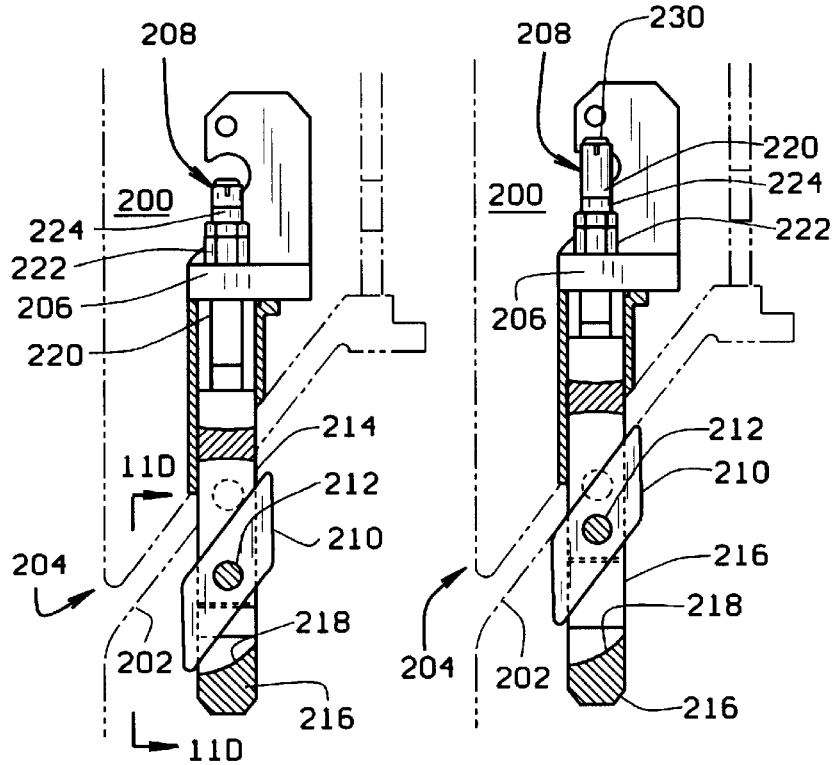

Referring to FIG. 11C, toggle 210 is fully rotated into position and is ready to be tightened against structure 202. FIG. 11D illustrates a slot 226 in sleeve 214 through which toggle 210 extends. Once toggle is rotated as shown in FIG. 11C, nut 222 is rotated in an opposite direction, e.g., clockwise, to draw bolt 208 upward so that toggle 210 tightly contacts conical shroud support structure 202. When toggle 210 is tightened as desired, crimp collar 224 is crimped into engagement with grooves in threaded portion 220 of bolt 208 to facilitate maintaining assembly 200 in position.

To remove assembly 200, sufficient torque is applied to nut 222 so that crimp collar 224 is released from engagement with the grooves in threaded portion 220 of bolt 208. Nut 222 is then rotated so that toggle bolt body 208 and toggle 210 are positioned as shown in FIG. 11C. As shown in FIG. 11D, a step 228 is formed on one side of slot 226, and as toggle bolt body 208 is lowered, toggle 210 bears against the side of slot 226 with the edge of toggle 210 under step 228. As toggle bolt body 208 is rotated upward while maintaining toggle 210 against step 228 of slot 226, toggle 210 cams back into sleeve 214 until toggle 210 is positioned as shown in Figure 11B.

The above described steps can be performed using a handling pole tool (not shown) fitted with a left hand threaded stud. The stud is threaded into a left hand threaded hole 230 at the end of toggle bolt body 208. The tool can be used to apply a counter clockwise torque to toggle bolt body 208 so that toggle 210 is held against the side of slot 226 and for lifting toggle bolt body 208.

As with assembly 100, toggle bolt assembly 200 enables toggle 210 to be remotely rotated so that toggle 210 can be easily and quickly engaged and disengaged from shroud support structure 204. Such assembly 200 also can be installed and removed under positive control so that friction or binding of toggle 210 that may not be overcome by gravity force is overcome by mechanically applied force.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A toggle bolt assembly, comprising:
   a toggle bolt body, said toggle bolt body comprising a tie rod engaging portion, a threaded portion and a lower toggle engaging portion, said tie rod engaging portion secured to one end of said threaded portion and said lower toggle engaging portion secured to the other end of said threaded portion,
   a toggle rotatably secured to said toggle bolt body at said lower toggle engaging portion, a crimp nut comprising a threaded nut portion and a crimp collar, said crimp nut threadedly secured to said upper threaded portion of said toggle bolt body, and a sleeve sized to have at least a portion of said toggle bolt body and said toggle located therein, said sleeve having a toggle opening so that said toggle can rotate from a first position in which said toggle is substantially located within said sleeve to a second position in which surface engaging portions of said toggle extend beyond said sleeve, a lower portion of said sleeve having a toggle rotation surface to facilitate rotation of said toggle.

2. A toggle bolt assembly in accordance with claim 1 wherein said toggle bolt tie rod engaging portion has a tool opening therein, said tool opening sized so that a tool for rotating said toggle bolt body can at least be partial inserted therethrough.

3. A toggle bolt assembly in accordance with claim 1 wherein a plurality of longitudinal grooves are formed in said upper threaded portion of said toggle bolt body.

4. A toggle bolt assembly in accordance with claim 1 further comprising a dowel pin press fit into engagement with said toggle and extending through an opening in said lower toggle engaging portion of said toggle bolt body and rotatable with respect to said toggle bolt body.

5. A toggle bolt assembly in accordance with claim 1 wherein said sleeve further comprises an upper support flange.

6. A toggle bolt assembly in accordance with claim 5 wherein said sleeve further comprises at least one shim slot so that a finger of a shim tool can extend through said shim slot and into contact with said toggle.

7. A toggle bolt assembly in accordance with claim 1 wherein said sleeve comprises a sheath portion, said toggle opening formed in said sheath portion.

8. A toggle bolt assembly in accordance with claim 7 wherein said sleeve further comprises a sheath nose secured to one end of said sheath portion.

9. A toggle bolt assembly in accordance with claim 1 wherein rotating said crimp nut in a first direction causes said toggle bolt body to move through said sleeve in one direction and rotating said crimp nut in a second direction causes said toggle bolt body to move through said sleeve in another direction.

10. A toggle bolt assembly, comprising:

a toggle bolt body, said toggle bolt body comprising a tie rod engaging portion, a threaded portion and a lower toggle engaging portion, said tie rod engaging portion secured to one end of said threaded portion and said lower toggle engaging portion secured to the other end of said threaded portion, a toggle rotatably secured to said toggle bolt body at said lower toggle engaging portion by a dowel pin press fit into engagement with said toggle and extending through an opening in said lower toggle engaging portion of said toggle bolt body and rotatable with respect to said toggle bolt body, a sleeve sized to have at least a portion of said toggle bolt body and said toggle located therein, said sleeve having a toggle opening so that said toggle can rotate from a first position in which said toggle is substantially located within said sleeve to a second position in which surface engaging portions of said toggle extend beyond said sleeve, a lower portion of said sleeve having a toggle rotation surface to facilitate rotation of said toggle, and a crimp nut comprising a threaded nut portion and a crimp collar, said crimp nut threadedly secured to said upper threaded portion of said toggle bolt body, and wherein rotating said crimp nut in a first direction causes said toggle bolt body to move through said sleeve in one direction and rotating said crimp nut in a second direction causes said toggle bolt body to move through said sleeve in another direction.

11. A toggle bolt assembly in accordance with claim 10, wherein a plurality of longitudinal grooves are formed in said upper threaded portion of said toggle bolt body.

12. A toggle bolt assembly in accordance with claim 10, wherein said sleeve further comprises an upper support flange.

13. A toggle bolt assembly in accordance with claim 10 wherein said sleeve further comprises at least one shim slot so that a finger of a shim tool can extend through said shim slot and into contact with said toggle.

14. A toggle bolt assembly in accordance with claim 10 wherein said sleeve comprises a sheath portion, said toggle opening formed in said sheath portion.

15. A toggle bolt assembly in accordance with claim 14 wherein said sleeve further comprises a sheath nose secured to one end of said sheath portion.

* * * * *